H. D. FORBES.
Combined Stopper and Paddle for Blacking Bottles.

No. 164,912. Patented June 29, 1875.

Witnesses
Frank G. Parker
H. Floyd Kurstner

Inventor.
Henry D. Forbes

UNITED STATES PATENT OFFICE.

HENRY D. FORBES, OF CAMBRIDGE, MASSACHUSETTS.

IMPROVEMENT IN COMBINED STOPPERS AND PADDLES FOR BLACKING-BOTTLES.

Specification forming part of Letters Patent No. 164,912, dated June 29, 1875; application filed April 14, 1875.

*To all whom it may concern:*

Be it known that I, HENRY D. FORBES, of Cambridge, in the county of Middlesex and State of Massachusetts, have invented a certain new and useful Combined Stopper and Paddle for Liquid Blacking, of which the following is a specification:

The nature of my invention consists in combining with the stopper-paddle of a blacking-bottle an elastic annular disk for fitting into the neck of the bottle, and making the same air-tight.

Figure 1:
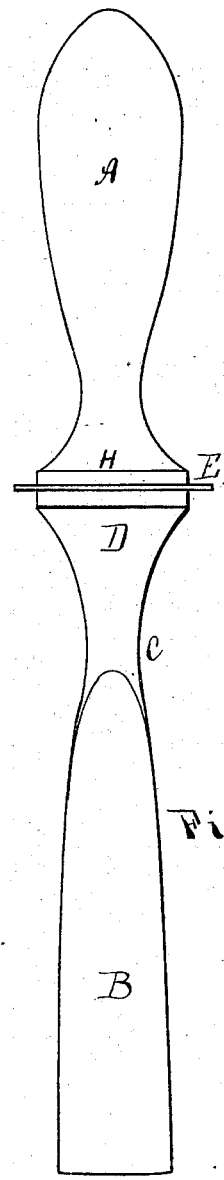
Figure 2:
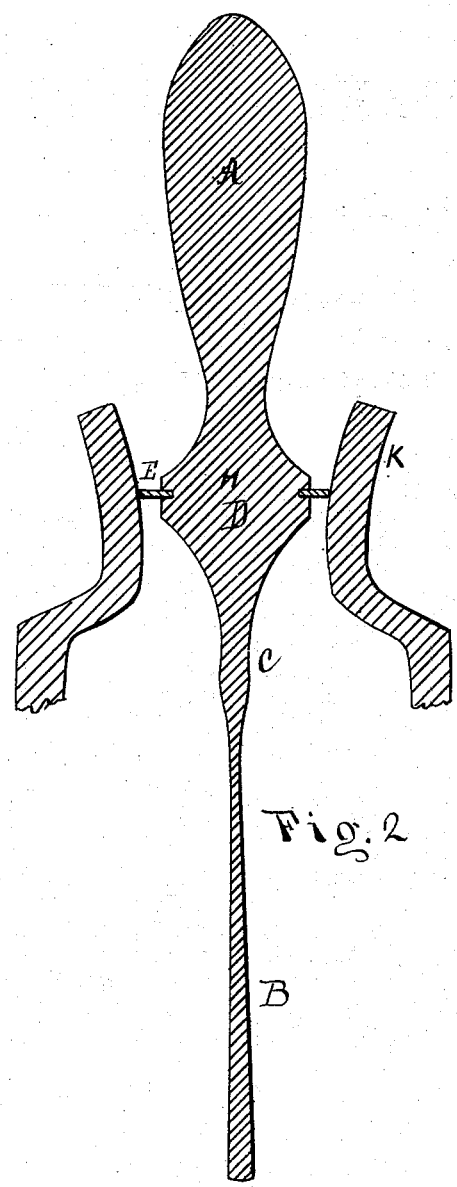

Figure 1 is an elevation of my device. Fig. 2 is a section of the same, also showing part of the bottle.

Let A represent the handle, and B the paddle or a device for stirring up the blacking, also for putting it onto the brush. C is the neck of the paddle, which terminates in the cone D. The base of the cone merges into the stopper H, as shown. E is a disk, secured to the stopper by a groove, as shown, or by any suitable means. This disk E should be of some yielding elastic material, so as to readily adapt itself to the neck of the bottle K. The object of making the lower part of the stopper coned, as at D, is, that it shall always fall into place when dropped into the bottle. By having the elastic disk E in connection with the cone the whole device becomes almost automatic—that is, if the end of the paddle is simply entered into the neck of the bottle and then dropped, the stopper will find its proper position, and close the neck of the bottle air-tight.

I claim as my invention—

The combination of the elastic annular disk E with the paddle-stopper H B, substantially as described, and for the purpose set forth.

HENRY D. FORBES.

Witnesses:
 FRANK G. PARKER,
 HENRY T. REMICK.